United States Patent

Heimann

[15] 3,643,219

[45] Feb. 15, 1972

[54] VISUAL DISPLAY SYSTEM

[72] Inventor: Richard F. Heimann, Sudbury, Mass.

[73] Assignee: Raytheon Company, Lexington, Mass.

[22] Filed: Mar. 13, 1970

[21] Appl. No.: 19,175

[52] U.S. Cl. ....................................340/172.5, 340/324 A

[51] Int. Cl. ....................................G06k 15/20, G06f 3/14

[58] Field of Search................340/172.5, 149, 324.1, 324 A; 235/61.7

[56] References Cited

UNITED STATES PATENTS

| | | | |
|---|---|---|---|
| 3,248,705 | 4/1966 | Dammann et al | 340/172.5 |
| 3,508,205 | 4/1970 | Kubie | 340/172.5 |

*Primary Examiner*—Gareth D. Shaw
*Assistant Examiner*—Ronald F. Chapuran
*Attorney*—Milton D. Bartlett, Joseph D. Pannone and Jeffrey P. Morris

[57] ABSTRACT

A limited access real-time data communication and display system wherein access to selected portions of stored data may be gained by the insertion of a coded identification card into the system resulting in the display on a cathode-ray tube of the selected data in a line raster adjacent to which and aligned with are a plurality of line selection switches which allow an operator to gain access to additional data in accordance with the displayed information and in accordance with the coded identification card.

25 Claims, 4 Drawing Figures

INVENTOR
RICHARD F. HEIMANN
BY Jeffrey P Morris
ATTORNEY

INVENTOR
RICHARD F. HEIMANN
BY Jeffrey P. Morris
ATTORNEY

INVENTOR
RICHARD F. HEIMANN
BY [signature]
ATTORNEY

VISUAL DISPLAY SYSTEM

REFERENCE TO RELATED APPLICATIONS

Application Ser. No. 19,190, filed Mar. 13, 1970 (Case No. 28,101), of Joseph E. Bryden titled Visual Display System and application Ser. No. 19,371, filed Mar. 13, 1970 (Case No. 28,118), of Richard F. Heimann titled Visual Display System are both assigned to the same assignee as this application and are hereby incorporated herein by reference.

SUMMARY OF THE INVENTION

A problem of the prior art in data communication and display systems in which a large volume of information must be accessed by personnel untrained in computer information retrieval techniques has been the development of a system which such personnel can effectively utilize. A further problem of the prior art in large computer control data communication systems has been the maintenance of data integrity, that is, the prevention of confidential data from being retrieved by unauthorized personnel. The present invention solves both of these problems by providing a real-time data communication system in which data stored in a central computer is subject to recall and display on a cathode-ray tube by a variety of individuals, some of whom are allowed access to certain portions of the stored data and some of whom are allowed access to certain other portions of the stored data. Each individual who would ordinarily use the system is given a coded identification card which serves to identify him and to enable the computer to release for display a particular block of data to which that individual is allowed access by the insertion of the coded card into a card reader, embodied in the present invention, which is present on the display console and which reads and transmits the code to the central computer, at which point it is acted upon in accordance with the computer software to release or not release selected data. Other stored data is accessible only by individuals whose coded cards permit access to that data. The invention is useful in banking, insurance, and retailing industries, as well as in the medical profession. For example, a nurse has instant access to patient data through a display console embodying the present invention by the insertion of her card therein but does not have access to other patient data reserved for the doctors who have differently coded cards. Likewise, the identification cards of individual doctors allow them access to patient data relating to their patients only and not to patient data pertinent to patients under the care of other doctors. This information is displayed in a raster of lines on a cathode-ray tube screen, adjacent to which are a plurality of selection switches physically aligned with the individual lines on the display. By actuating a selection switch, a nurse may obtain an additional frame of data pertaining in detail to the information contained in the selected line. This additional frame of information is also arranged in a raster of lines, enabling another series of choices as to additional data to be made, thereby allowing an operator to obtain progressively more detail information on a subject of interest by merely pushing a button aligned with a line of interest on the cathode-ray tube display.

A plurality of like consoles of the present invention may be operated from a central memory. Operationally, character information for a complete raster of the cathode-ray tube is dynamically stored in a recirculating device, such as a sonic delay line, so that the entire contents of the delay line are fed through a simple readout circuit which continuously supplies the stored character information to a monoscope for generation of the displayed characters from a character target matrix and also nondestructively recirculates the stored frame of information for resupply to the monoscope at a frame scan rate of, for example, in excess of 60 times per second so that objectionable flicker does not occur on the cathode-ray tube face. The ID codes are also recirculated during retrace time and constantly fed to the computer which senses through the ID-coded inputs the presence or nonpresence of a valid ID card and the data which may be released in accordance with the particular code received. Data integrity is preserved by the generation of two different codes upon insertion of a valid ID card, both of which codes are relayed to the central computer, the first code alerting the computer to the presence or nonpresence of a valid ID card and the second code determining the particular data to be released for display upon insertion of a valid ID card.

Therefore, it is an object of this invention to provide an improved data display system in which data access is limited in accordance with the coding on an identification card.

Another object of the invention is the provision of a plurality of selection switches aligned with the individual lines of a cathode-ray tube display with which an operator may gain access to additional data connected with the data to which access is permitted by the operator identification card.

Yet another object of the invention is the provision of a data display system which is in standby mode when not in use in which the communication circuitry is always prepared to accept and release valid data and in which the acceptance of valid data raises the system power input from a standby to a display level.

Numerous other objects and advantages of the invention will be brought out in the description to follow. This description is accompanied by drawings wherein:

DESCRIPTION OF THE PREFERRED EMBODIMENT

Figure 1:
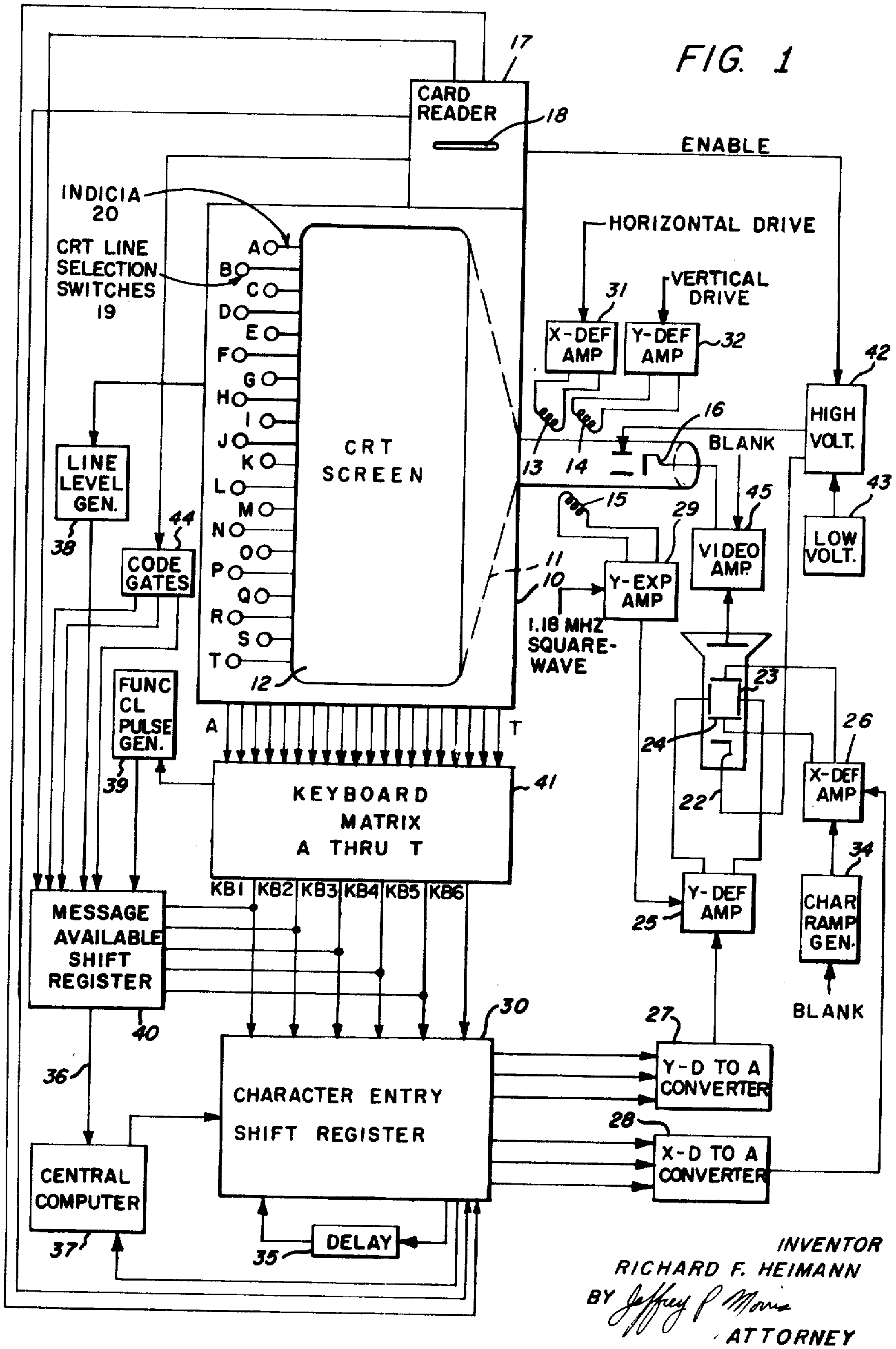
FIG. 1 is a block diagram of a data display system embodying the instant invention.

Referring now to FIG. 1, there is shown a cathode-ray tube display system embodying the invention. A display console 10 contains a cathode-ray tube 11 of conventional type including a fluorescent screen 12, horizontal deflection coil 13, vertical deflection coil 14, high-frequency auxiliary vertical deflection coil 15, cathode 16, auxiliary electrodes and a high-voltage anode (not shown). These elements of the cathode-ray tube are supplied with biasing voltages and currents in accordance with well-known practice to develop a raster of lines of characters.

A card reader subconsole 17, located on display console 10, includes a slot 18 into which a plastic encoded card containing a plurality of punched holes in rows and columns may be inserted. The code serves to identify the user to the system and to display a block of information on the cathode-ray tube screen to which the user is allowed access. This block of information can be further broken down to obtain greater detail by the use of the cathode-ray tube line selection switches 19, identified as A through T, which are aligned with lines 4 through 23 of the screen presentation by indicia lines 20 which enable an operator to visually line up the appropriate switch with its corresponding line on the cathode-ray tube screen presentation. Of course, any number of cathode-ray tube line selection switches may be employed which may align with any desired lines on the cathode-ray tube screen. When a cathode-ray tube line selection switch is actuated, the information displayed on the cathode-ray tube screen is erased and replaced by a complete new frame of information which corresponds to the data contained on a line in the previous display adjacent to the depressed cathode-ray tube line selection switch. The operation and circuit details of the cathode-ray tube line selection switches are disclosed in greater detail in copending application Ser. No. 19,190, filed Mar. 13, 1970 (Case No. 28,101), of Joseph E. Bryden titled Visual Display System, which description is incorporated herein.

Cathode 16 is fed negative video signals and positive blanking signals from the output of a video amplifier which may have a video band-pass characteristic of from 15 to 50 megacycles or greater, depending upon the desired writing speed. A video preamplifier (not shown) amplifies incoming signals to the video amplifier and is fed from the target electrode 21 of a monoscope 20 of conventional type having a cathode 22, vertical deflection plates 23, horizontal deflection plates 24, and grid-focusing auxiliary electrodes (not shown) of well-known conventional design.

An electron beam originating at cathode 22 is accelerated toward a target anode 21 at the other end of the tube. The target anode, in accordance with well-known practice, may be, for example, an aluminum oxide disc with alphanumeric and other special symbol characters deposited thereon in carbon or other desired material. When the electron beam from cathode 22 scans an area of target 21, secondary emission characteristics will vary, depending upon whether the beam strikes the aluminum oxide target or a portion of the carbon character positioned thereon to produce an output signal.

The vertical deflection plates 23 of the monoscope are fed from a vertical or Y deflection amplifier 25, while the horizontal deflection plates 24 are fed from horizontal or X deflection amplifier 26. The purpose of the monoscope deflection amplifiers is to convert digital character codes into analog voltages for deflecting the monoscope scan. Y deflection amplifier 25 has an output derived from a Y axis digital-to-analog converter 27, while X deflection amplifier 26 is fed from an X axis digital-to-analog converter 28. Digital-to-analog converters 27 and 28 include well-known storage registers (not shown) which are connected in parallel with character entry shift register 30 so that when a digital code is in the character entry shift register, it is also in storage registers of the digital-to-analog converters 27 and 28.

The digital character code is a six-bit binary code, the three most significant bits of which are fed to the X axis digital-to-analog converter 28 for positioning the monoscope scan in the X axis, while the three least significant bits are fed to the Y axis digital-to-analog converter 27 for positioning the monoscope scan in Y axis. The six-bit digital character code is formed in a keyboard 41 which contains, for example, a diode matrix for producing the requisite code when the appropriate character keys are actuated. The character keys are capable of producing visual characters on the cathode-ray tube screen and may include, for example, the letters A through Z and numbers 0 through 9.

A message available line 36 is fed from a message available shift register 40 which transfers line selection codes from the cathode-ray tube line selection switches 19 to a central computer 37 which responds in accordance with its programming. The message available shift register 40 also receives a coded signal from the card reader 17 which indicates whether a valid identification (ID) card has been either entered or withdrawn from the card reader assembly through slot 18. When a valid ID card is inserted therein, a three-bit digital signal is developed in coding gates 44 wherein the outputs of two flip-flops are combined, which outputs are parallel transferred to shift register 40 and sent along line 36 to the central computer 37, wherein the computer software recognizes that a valid ID card has been inserted in the card reader.

A six-bit digital code, which is determinative of the information to which a card holder is allowed access, is developed in the card reader circuitry, as will be described with reference to FIG. 2, and is sent to the character entry shift register 30 output gating 74, where it is recirculated through delay 35 and fed to computer 37 during horizontal retrace time, as will be described with reference to FIG. 4. Thus, the computer software responds to the six-bit code to display a particular block of data on the cathode-ray tube screen, while the three-bit code functions as a security measure which permits the data display only while a valid ID card is present in the card reader. When the card is withdrawn, a different three-bit code is developed, as will be explained with reference to FIG. 4, which prevents the computer from acting on the six-bit code in accordance with the computer programming. Of course, codes of different bit lengths may be used.

The use of codes to indicate ID card entry and exit rather than a simple switch to prevent data transfer has the advantage of keeping the message available line 36 open at all times whether a card is inserted in the reader or not. Since the message available line carries codes in addition to the ID card code, it cannot be closed. For example, the cathode-ray tube line selection codes are fed to the computer 37 through message available register 40 via line 36 in a manner similar to that of the ID card entry and exit codes, as is described in application Ser. No. 19,371, filed Mar. 13, 1970 (Case No. 28,118), of Richard F. Heimann titled Visual Display System, copending herewith. When a key is depressed on the keyboard, a magnetically actuated reed switch within the key allows current to flow through a branch of the keyboard matrix which may be a diode matrix such as that of the aforementioned copending application of Richard F. Heimann.

The presence of a valid card in the card reader additionally operates a relay (not shown) to switch the system power from standby, provided by low-voltage supply 43 to full power provided by high-voltage supply 42 to supply the sweep and anode voltages.

The matrix output is a six-bit digital code coupled over six output lines designated KB–1 . . . KB–6. The cathode-ray tube selection switch code is a five-bit digital code which is coupled over lines KB–1 . . . KB–5 to the message available line shift register 40 and which is developed in the keyboard diode matrix. Line level generator 38 and function clear pulse generator 39 gate the message available register 40 when a cathode-ray tube selection switch is depressed, line level generator 38 providing a logic signal indicative of the fact that a cathode-ray tube selection switch has been depressed and function clear pulse generator 39 providing a pulse to clear the message available register, the combination of which transfers the five-bit cathode-ray tube selection code from lines KB–1 through KB–5 into message available shift register 40. The six-bit code, once formed, is parallel transferred into the character entry shift register 30. Whether a digital character code originates at keyboard matrix 41 or at the central memory in computer 37, once in the character entry shift register 30, it is serially shifted out of register 30 into delay line 35 at the end of each character time. At the same time, the character code is parallel transferred to the appropriate storage register in the X and Y digital-to-analog converters 27 and 28 to provide the analog voltages necessary for monoscope beam positioning, thereby providing the intensity modulation through the video amplifier 17 which generates the character display on the cathode-ray tube screen.

The character code is delayed for a period of time corresponding to the frame scan time in the delay line, which in the present embodiment is approximately 67 scans per second, requiring a delay of approximately 14.78 milliseconds. The frame time is the time required for the cathode-ray tube scan to move, from a character position on the screen through a complete scan cycle and back to the original character position, and is equal to the sum of the delay time of delay 35 and shift register 30. One character time after the character code is serially shifted out of character entry shift register 30, register 30 is cleared, the last bit of the character code has entered the delay line, and the cathode-ray tube scan has moved to the next character position on the screen. The delay line refresh memory loop refreshes register 30, and hence the display, 67 times a second.

The horizontal drive timing signal fed to X deflection amplifier 26 from a central timing source, which is described in the aforesaid application Ser. No. 19,190, filed Mar. 13, 1970 (Case No. 28,101), of Joseph E. Bryden Titled Visual Display System, filed copending herewith, is an 83-microsecond gate pulse which represents the horizontal line retrace time and is equivalent to seven character times. This pulse is followed by a 532-microsecond interval which corresponds to the horizontal trace time required to enter 45 characters into the memory. Thus, the 83-microsecond gate signals occur at 615-microsecond intervals which is the combined horizontal line trace and retrace period.

The vertical drive timing or vertical retrace signal is fed to the vertical deflection amplifier 32 from the central timing source and is a gate pulse 611 microseconds wide which corresponds to one horizontal line time and is the vertical retrace time. These gates are approximately 14.78 milliseconds apart which represents the frame time or the time necessary to generate 23 horizontal line pulses plus the vertical retrace time. The frame scan rate or refresh time, in the embodiment illustrated, is 67 cycles per second.

A Y axis expansion amplifier 29, which is fed a square wave from the central timing source, drives the high-frequency auxiliary deflection coil 15 with a sinusoidal waveform at 1.18 megacycles in the embodiment shown. However, a wide range of frequencies may be used within the 1-megacycle plus or minus a fraction range. Auxiliary deflection coil 15 is a resonant circuit which changes the square wave signal to a sine wave and which may occur, for example, at the rate of 12 times per character and which, when applied to coil 15, increases the horizontal line height to cover the character height on the cathode-ray tube. The Y axis expansion amplifier output is also combined with the Y axis analog voltage in Y deflection amplifier 25, causing the monoscope beam to sweep up and down a character symbol.

A signal applied to horizontal deflection amplifier 26 from character ramp generator 34 produces a sawtooth wave shape which develops a ramp voltage that will drive the monoscope electron beam across the characters. No sawtooth is present during horizontal or vertical retrace due to blanking. The blanking circuitry timing details are described in the aforesaid application Ser. No. 19,190 (Case No. 28,101), to Joseph E. Bryden, copending herewith. Blanking pulses are also applied to the video amplifier during retrace and between characters, thereby synchronizing the operation of the monoscope with the cathode-ray tube sweep and the intensity modulation of the cathode-ray tube cathode 16 to reproduce the characters on the cathode-ray tube screen.

Figures 2, 3:
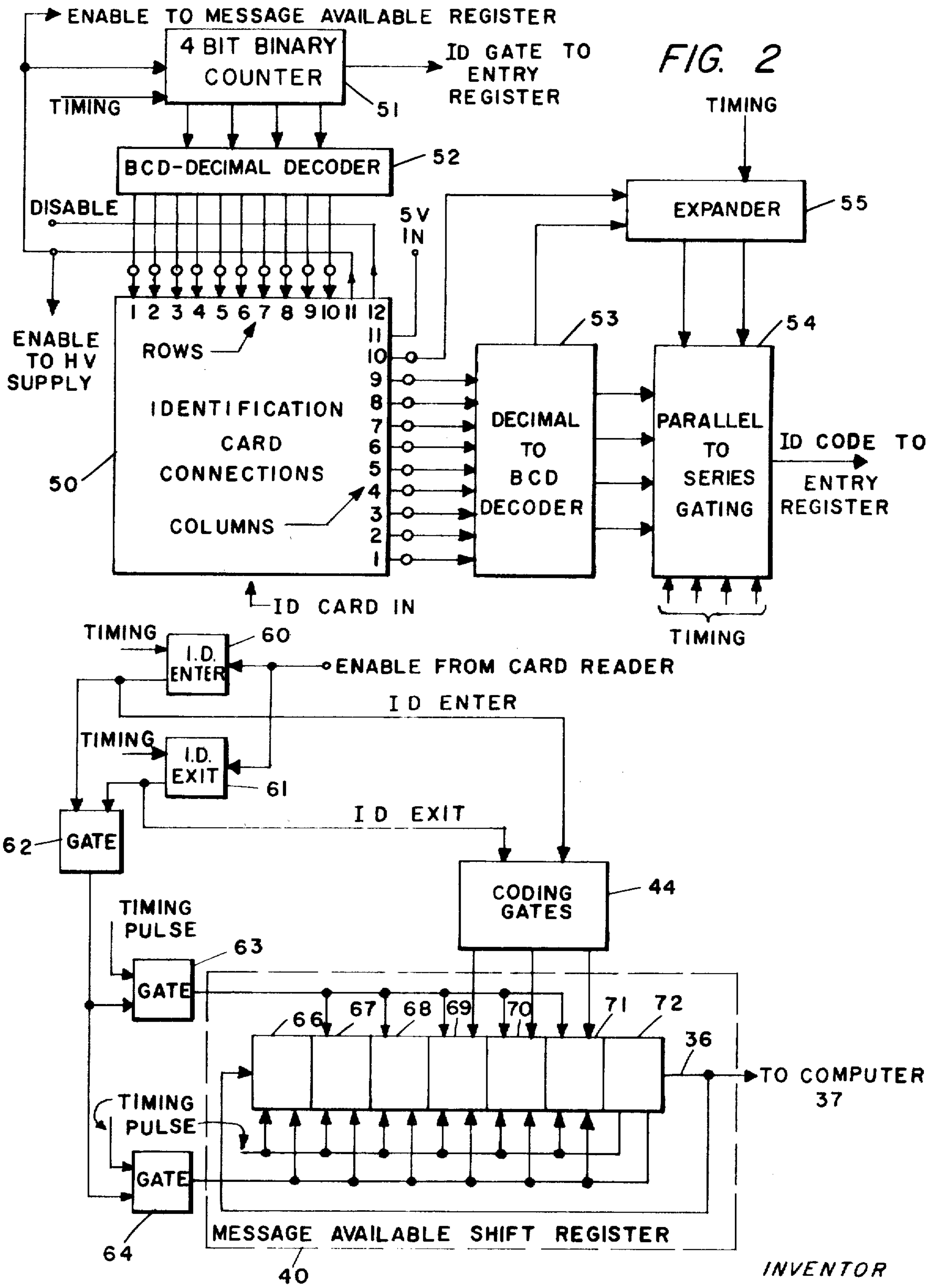
FIG. 2 is a block diagram of the card reader of the instant invention.
FIG. 3 is a block diagram of the message available shift register with associated gating circuitry of the instant invention.

Referring now to FIG. 2, which is a block diagram of the card reader circuitry, an identification card is insertable into identification card connections 50 which include an array of metal fingers (not shown). As previously mentioned, the plastic encoded card has punched therein a plurality of holes which represent data in rows and columns. There are 12 rows and 11 columns, with the resulting punched code being a decimal equivalent code, although 12 rows and 12 columns may be used. The columns represent the digits of the identification (ID) number, with column 1 being the most significant digit and column 10 the least significant digit. In the instant embodiment, the first 10 columns are punched for the various ID numbers, while the eleventh row of the eleventh column is always punched on a legitimate card and serves to make a connection in the card reader between a mechanical feeler (not shown) which extends through the punched hole and a low-voltage source, in the present embodiment 5 volts, which provides a signal indicative of the presence of a valid card to gating circuitry which will be explained with reference to FIG. 4. This signal also provides a signal to the high-voltage supply 42 to switch from standby which is provided by a low-voltage supply 43 to full power. The switch (not shown) may be a conventional mechanical relay. Hole 12 is never punched in a legitimate card but would provide a disabling signal if punched by virtue of contact being made through the hole by a mechanical feeler of the card reader assembly.

The rows represent the decimal equivalent values of the digits of the ID number. When an ID card is properly inserted in the card reader, it is read a column at a time to obtain the decimal equivalent from each row for each corresponding column. Once inserted, a contact is closed in the eleventh row of the eleventh column which enables a four-bit binary counter 51 to begin to count. The binary counter outputs are applied to a binary coded decimal (BCD) to decimal decoder 52, and the rows are read one at a time from one through 10. As each row is read, the column inputs to decimal to BCD decoder 53 are enabled one at a time and the equivalent decimal signals are converted back to binary-coded decimal in decoder 53 which supplies a four-bit code to parallel to series conversion gating circuitry 54 wherein the code is put into serial form. Since the character entry shift register 30 is designed for a six-bit code, an expander 55 adds two additional bits to the code which may both be zeros. In the embodiment shown, the hole in the tenth column is always punched in a legitimate card to distinguish between a real ID card and a blank. This additional bit is inputted to the expander and would appear as a logical one in the serial code. Other than the case in which a blank is present, however, the output of parallel to series circuitry 54 is always two zeros followed by a four-bit code.

This six-bit code is applied to the output gating 74 of the character entry register 30 where it is entered into the refresh memory loop and fed to computer 37 which acts on the code in accordance with its program to release for display the appropriate block of data. This code is entered into the refresh memory loop during horizontal retrace time so that delay line bit capacity is conserved, as will be explained with reference to FIG. 3.

As previously mentioned, the insertion of a valid ID card allows an electrical connection to be made at the eleventh row of the eleventh column through the hole punched in the card thereat. This generates an enabling voltage which switches on the high-voltage power supply 42 and also starts bit counter 51 counting. In addition to counting, bit counter 51 also supplies counting pulses to the character entry shift register output gating 74 which serves to gate in the six-bit code output of parallel to series gating 54 in accordance with the overall system timing which is described in the aforementioned copending application Ser. No. 19,190 (Case No. 28,101) of Joseph E. Bryden.

BCD to decimal decoder 52, decimal to BCD decoder 53, bit counter 51, expander gating 55, and parallel to series gating 54 are of conventional type. Timing pulses from a central system clock are applied to the parallel to series gating to clock out the serial code in time slots compatible with those of the character entry register 30, and bit counter 31 also is timed to clock at the system clock rate by timing pulses from the system timing.

As previously mentioned with reference to FIG. 1, when a valid ID card is entered or withdrawn from the card reader assembly, a three-bit code is developed in coding gates 44 which is parallel transferred to register 40, put in serial form and sent along line 36 to computer 37.

FIG. 3 illustrates the message available shift register 40 coding. The 5-volt enabling voltage developed upon insertion of a valid ID card in row 11, column 11 in the card reader assembly shown in FIG. 2 is fed to ID enter flip-flop 60 and ID exit flip-flop 61. When an ID card is entered, flip-flop 60 generates a pulse which is sent to gate 62. When an ID card is removed, flip-flop 61 generates a pulse which is also sent to gate 62. Pulses from either flip-flop 60 or 61 are passed through gate 62 in accordance with the system timing to gates 63 and 64 which initiate control of message available register 40. The two outputs from gates 63 and 64, respectively, initiate control for transferring either the ID entry code or the ID exit code from the message available coding gates 65 to shift register 40 which includes seven flip-flops, 66 through 72.

Two-tenths of one microsecond after the leading edge of either an ID enter pulse or an ID exit pulse occurs at gate 62, a timing pulse from the central timing source is applied to gate 64, developing a clear pulse which is applied to the clear inputs of flip-flops 66 through 72, clearing the message available shift register of data.

Two-tenths of one microsecond after the trailing edge of the clear pulse occurs, a second timing pulse is applied to gate 63 that parallel inputs the ID entry or exit codes into register flip-flops 69, 70 and 71. Once message available data bits have been parallel transferred into the message available register, they are serially read out to the message available data line 36 in accordance with the system timing in a series of data bit time slots, the data in line 36 being transferred to computer 37 as well as being serially read back into the register for recirculation to provide continuous readout while the coded input is present. The computer software is responsive to ID entry and exit codes to allow recall of data which is inputted to register 30, as will be explained with reference to FIG. 4.

Coding gates 65 which receive the ID entry codes 110 and 111, respectively, may be flip-flops or direct logic gate inputs. As message available data bits are shifted right from flip-flop 72, they are recirculated back to the input of flip-flop 66, thereby forming a serially clocked chain of recirculating bits continuously read to line 36.

As previously mentioned, the horizontal retrace time is 83 microseconds, which is equivalent to seven character times and occurs at 615-microsecond intervals, which is the horizontal line trace time plus the horizontal line retrace time. The serial code output of gating 54 enters the character entry output gating 74, shown in FIG. 4, during the horizontal retrace time for transmittal to computer 37 and recirculation through the refresh memory loop. Entry is accomplished in accordance with the gating pulse derived from bit counter 51 which clears the output gating 74 for entry of the six-bit serial code. In summary, two codes are generated: the three-bit code that alerts the computer to the presence or nonpresence of an ID card and the six-bit serial code that determines the data to be displayed. Both codes are fed to the computer and are recirculated, the former in the message available register 40 and the latter in the refresh memory loop.

Figure 4:
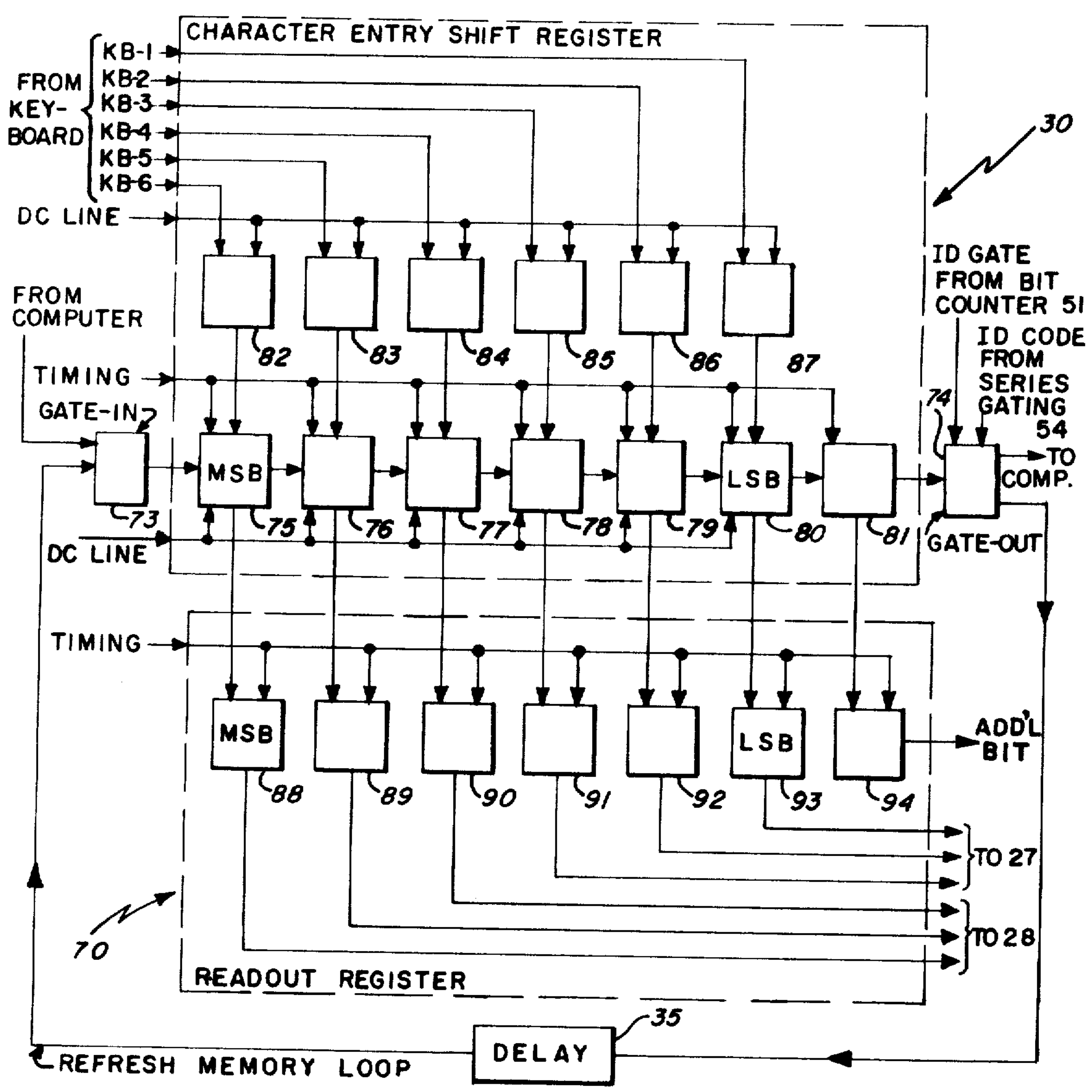
FIG. 4 is a block diagram of the recirculating memory of the instant invention.

The refresh memory loop shown in FIG. 4 consists of the character entry shift register 30, delay 35 and associated entry and exit gates 73 and 74, respectively. The purpose of the refresh memory loop is to provide a constant refresh of characters on the cathode-ray tube screen. As discussed with reference to FIG. 1, digital character codes, whether entered from keyboard 41 or from computer 37, enter the refresh memory loop at character entry shift register 30 wherein the code is serially shifted bit by bit out of the register and into delay line 35 while simultaneously parallel transferred into storage registers in the X and y digital-to-analog converters 27 and 28. Thus, when the cathode-ray tube selection switch is depressed, a five-bit code associated with that switch is clocked through message available register 40 to computer 37 in a similar manner to the clocking of the three-bit ID enter and exit codes, enabling a complete 23-line frame of data to be entered into the character entry register from the computer in accordance with the cathode-ray tube selection switch selected. Thus, limited access to data stored in the computer memory is provided, first by the ID card coding and second by the breaking down of the allowed data by cathode-ray tube selection switches. A complete raster of information comprising upwards of 1,500 character address signals may be dynamically stored in the recirculating delay line.

Register 30 is a seven-bit shift register comprising flip-flops 75 through 81 which performs the dual function of keyboard interface through data entry gates 82 through 87 and refresh memory access through data entry and exit gates 73 and 74, respectively. Whenever a character code is available for entry, a DC signal is produced immediately after the formation of the character code which clears flip-flops 75 through 80 for entry of the character code and allows an additional bit if required to be located in register 30 in flip-flop 81, which flip-flop represents the intercharacter time. Since register 30 is series connected to the delay line, one of the characters or retrace characters circulating in the loop is always present in the register. As previously described, delay line data enters register 30 through input gate 73, timing pulses from the central timing source are applied to register 30, and characters are transferred least significant bit first. The intercharacter bit, which is a zero, is the first to enter register 30 and is clocked into flip-flop 75 during intercharacter time. The next six successive timing pulses shift the six-bit character code into the register until after a total of seven bit times a complete character code is held therein and at which time the character code is parallel transfered into X and Y digital-to-analog storage and readout register 70, including flip-flops 88 through 93, and 94. Thus, the transfer is practically simultaneous with character entry into register 30.

The purpose of delay 35 is to dynamically store the character address signal and the ID code signals which are recirculated in the refresh memory loop during trace and retrace times, respectively. Delay 35 is an internal storage device of the ultrasonic or magnetostrictive type although other dynamic delays of well-known design may be used. In the present embodiment, upwards of 1,200 characters and retrace characters are delayed approximately 14.78 milliseconds and refreshed approximately 67 times per second. The specific delay means may consist of 50 to 100 feet of coiled wire into which a magnetostrictive transducer converts electrical into mechanical energy which applies torsion to one end of the wire, which torsion travels down the wire at about 9 microseconds per inch and appears at the other end after a delay time dependent upon the length of wire used. At the output end, the torsional movement is reconverted into electrical energy after a delay of, for example, 7 to 15 milliseconds by a second magnetostrictive transducer and amplified, if necessary, before returning to the refresh memory loop. As previously mentioned, the refresh memory loop is described in greater detail, including the timing sequence, in application Ser. No. 19,190 (Case No. 28,101) of Joseph E. Bryden, copending herewith.

It is to be understood that the details set forth herein are illustrative of the novel features that characterize the invention and that various changes and modifications are possible. For example, a badge comprising an opaque plastic material body within which an array of ferromagnetic elements are embedded may be used instead of the punched card of the present system. The ferromagnetic elements are obscured from sight and detection of their presence and locations, or unauthorized alteration of their position being almost impossible. An ID card reader, for use with a ferromagnetic badge, might comprise an array of magnetically actuated switching means and an array of magnets associated therewith, the switching means forming part of a switching matrix circuit and the magnets being spaced from their associated switching means to enable an ID card to be inserted therebetween, the magnetic circuit of each associated magnet and switching means being such that the switching means normally assumes one state but changes to another state when an ID card with a ferromagnetic element is located in correspondence with the magnet and switching means whereby the insertion of an ID card with ferromagnetic elements at predetermined locations would cause selected switching means to assume the other state.

What is claimed is:

1. A visual display system comprising:

a visual display area;

an interrogating element movable from an aperture in the display system;

character generation means for generating characters on the visual display area in response to input signals;

storage means responsive to the interrogating element for supplying input signals to the character generation means; and wherein the interrogating element comprises a coded card insertable into said aperture in the display system.

2. A visual display system in accordance with claim 1, wherein the interrogating element contains a predetermined information pattern thereby causing information to be released from storage in accordance with the predetermined information pattern.

3. A visual display system in accordance with claim 1, wherein the interrogating element contains a predetermined information pattern which identifies the user and causes the storage means to supply input signals to the character generator whereby a visual display is generated corresponding to the information in the storage means to which the interrogator is allowed access.

4. A visual display system in accordance with claim 1, further comprising a chassis housing the display system and wherein the interrogating element comprises a coded card insertable into said aperture.

5. A visual display system in accordance with claim 4, wherein the interrogating element contains both column and row data.

6. A visual display system in accordance with claim 1, further comprising a low-voltage power supply and a high-voltage power supply wherein interrogation by the interrogating element causes the high-voltage supply to drive the character generation means.

7. A card-actuated display system comprising:

a visual display area;

an interrogating element insertable into the display system;

first storage means responsive to the interrogating element for allowing access to selected data stored in said first storage means in accordance with informational data on the interrogating element;

second storage means for recirculation of said informational data to said first storage means while the interrogating element is inserted in the display system; and character generation means responsive to said selected data for generating characters on the display area.

8. A card-actuated display system in accordance with claim 7, further comprising:

a cathode-ray tube; and third storage means for storing additional informational data and transferring said additional informational data to said first storage means whereby the data selected in accordance with the informational data on said interrogating element is either displayed on said cathode-ray tube or inhibited according to said additional data.

9. A card-actuated display system in accordance with claim 7, wherein the informational data on the interrogating element is in the form of a digital code which identifies the user and causes said first storage means to supply stored data in the form of character address codes to the character generation means whereby a visual display is generated corresponding to the information in the first storage means to which coding on the interrogating element allows access.

10. A card-actuated display system in accordance with claim 9, wherein said second storage means includes:

a shift register including data entry and exit gates; and delay means in series with said shift register whereby an entire frame of displayed character information is recirculated through said shift register and said delay means while simultaneously nondestructively parallel transferred to said character generation means.

11. A card-actuated display system in accordance with claim 10, wherein said recirculating data includes digital character address codes and retrace intervals during which intervals horizontal retrace and vertical retrace occurs on the cathode-ray tube.

12. A card-actuated display system in accordance with claim 11, wherein the digital code on said interrogating element is recirculated in said second storage means and nondestructively series transferred to said first storage means during retrace intervals.

13. A card-actuated display system in accordance with claim 12, further comprising a chassis housing the display system and wherein the interrogating element comprises a coded plastic card insertable into an aperture in the chassis.

14. A card-actuated display system in accordance with claim 13, wherein the interrogating element contains both column and row data.

15. A card-actuated display system in accordance with claim 14, further comprising a low-voltage power supply and a high-voltage power supply wherein interrogation by the interrogating element causes the high-voltage supply to drive the character generation means.

16. A card-actuating display system comprising:

a visual display area;

an interrogating element insertable into the display system;

first storage means responsive to said interrogating element for allowing access to selected character display data stored in said first storage means in accordance with a first digital code on said interrogating element;

means for reading said first digital code and for developing a second digital code;

second storage means for recirculation of said second digital code and for nondestructive transfer of said second digital code to said first storage means while the interrogating element is present in the display system; and character generation means responsive to said selected data for generating characters on the display area.

17. A card-actuated display system in accordance with claim 16, further comprising:

a cathode-ray tube; and third storage means for storing additional informational data and transferring said additional informational data to said first storage means whereby the data selected in accordance with the informational data on said interrogating element is either displayed on said cathode-ray tube or inhibited according to said additional data.

18. A card-actuated display system in accordance with claim 17, wherein said additional informational data includes a third digital code which is indicative of the presence or nonpresence of said interrogating element.

19. A card-actuated display system in accordance with claim 18, further including:

a plurality of switches aligned with selected areas of the cathode-ray tube screen which when actuated develop a fourth digital code indicative of the informational content of the cathode-ray tube area selected; and means for transferring said fourth digital code to said first storage means through said third storage means whereby other data stored in said first storage means is selected in accordance with said fourth digital code.

20. A card-actuated display system in accordance with claim 19, wherein said third storage means includes a data recirculating shift register wherein recirculation and transfer of said third and fourth digital codes to said first storage means occurs.

21. A visual display system in accordance with claim 4 wherein said interrogating element comprises a coded plastic card.

22. In combination:

means for receiving a coded interrogating element;

first storage means responsive to said interrogating element for allowing access to selected data stored in said first storage means in accordance with informational data on the interrogating element;

means for recirculating said informational data on said interrogating element to said first storage means while the interrogating element is interrogating said first storage means; and means for deriving a readout of selected data stored in said first storage means.

23. A combination in accordance with claim 22 wherein said recirculating means comprises a second storage means for storing and recirculating coded data on said interrogating element.

24. A combination in accordance with claim 22 wherein said means for receiving said interrogating element comprises a card reader and wherein said interrogating element comprises a coded card readable by said card reader.

25. A combination in accordance with claim 24 wherein said readout means comprises a visual display.